United States Patent
Peeters

(12)
(10) Patent No.: US 6,931,079 B1
(45) Date of Patent: Aug. 16, 2005

(54) POWER REDUCTION

(75) Inventor: Miguel Philipe Paul Peeters, Brussels (BE)

(73) Assignee: Broadcom Corporation, Irvine, CA (US)

( * ) Notice: Subject to any disclaimer, the term of this patent is extended or adjusted under 35 U.S.C. 154(b) by 758 days.

(21) Appl. No.: 09/634,750

(22) Filed: Aug. 9, 2000

(30) Foreign Application Priority Data

Jun. 21, 2000 (GB) .................................. 0015236
Jul. 19, 2000 (GB) .................................. 0017726

(51) Int. Cl.⁷ ..................... H04L 27/04; H04L 25/03

(52) U.S. Cl. ..................... 375/296; 375/295

(58) Field of Search ................... 375/285, 296, 375/254, 278, 284, 346, 295

(56) References Cited

U.S. PATENT DOCUMENTS

| | | | | |
|---|---|---|---|---|
| 5,631,969 A | * | 5/1997 | Hanson | 381/107 |
| 5,787,113 A | * | 7/1998 | Chow et al. | 375/219 |
| 6,038,261 A | | 3/2000 | Mestdagh | |
| 6,363,109 B1 | * | 3/2002 | Polley et al. | 375/222 |
| 6,597,746 B1 | * | 7/2003 | Amrany et al. | 375/296 |

\* cited by examiner

Primary Examiner—Temesghen Ghebretinsae
Assistant Examiner—Sam K Ahn
(74) Attorney, Agent, or Firm—Sterne, Kessler, Goldstein & Fox P.L.L.C.

(57) ABSTRACT

There is disclosed a technique in which any peaks above a threshold level are reduced, but not clipped, such that the effects of such peaks is reduced. Although the implementation of the technique preferably includes a clipping step, it is performed on the front-end rather than as the last step in the technique, such that the output signal is not a clipped signal. Any noise introduced by the clipping step, so-called clipping noise, is preferably filtered out of the useful frequency band of the signal.

17 Claims, 6 Drawing Sheets

POWER REDUCTION

FIELD OF THE INVENTION

The present invention relates to a technique for reducing the maximal signal amplitude and hence the crest factor of a signal, for example, a multi-carrier signal such as a DMT (discrete multi-tone) signal, and particularly but not exclusively to such a signal generated by a modem.

BACKGROUND OF THE INVENTION

The amplitude distribution of a band-limited, over-sampled signal such as a multi-carrier signal, generated by an ADSL (asymmetric digital subscriber line) modem, can be considered as Gaussian with a zero mean and a variance equal to the power of the transmitter signal. The envelope of such multi-carrier signals randomly present, with a small probability, peaks of a very high amplitude. The span (i.e. the peak to peak voltage) of signals driven by the line driver, which is the component dedicated to transmit the power on the line, is important. The power consumption of the line driver is strongly related to the span of the voltage. In order to keep a reasonable level of power consumption, a certain amount of "clipping" of voltage peaks is desired. Such clipping reduces the voltage peaks of the signal.

However, any such clipping generates broadband noise, usually on the whole bandwidth of the signal. This noise causes loss of data: in the transmit direction by suddenly increasing the background noise; and in the receive direction due to the leakage of the noise through the hybrid. This effect in the receive direction is mainly visible in systems utilising echo cancellers.

Consequently, too frequent clipping causes degradation of the overall bit error ratio of the transmission, resulting in data being lost. Thus, whilst a small amount of clipping is allowable and tolerable, the probability of clipping occurring must be small enough to ensure good performance, i.e. no significant data loss.

U.S. Pat. No. 6,038,261 discloses a method for set-up of a signal in multi-carrier modulation, including clipping of the signal amplitude. A feedback loop is utilised to reinject a clipping noise from a previous pulse into a new pulse. The clipping noise is redistributed outside the useful slip of the signal. This method ensures that the signal never exceeds a predetermined threshold, since the output signal is obtained directly from the output of a clipping circuit. However, the use of a feedback loop makes the behaviour of the technique unpredictable when processing a sequence of pulses. Whilst the technique works in a predictable fashion when processing two successive peaks, feeding the re-distributed noise of the first back to the second, with a sequence of peaks operation would be unstable. With a sequence of peaks it would be difficult to predict the contribution made by successive peaks in the feedback loop, and the system would be too unpredictable for reliable operation.

It is an object of the present invention to provide a technique that reduces the maximum signal amplitude of a multi-carrier signal whilst maintaining the integrity of the signal. In particular the invention aims to reduce the maximum signal amplitude whilst maintaining the bit error ratio of the original multi-carrier signal. Consequently the invention reduces the crest factor of the signal.

SUMMARY OF THE INVENTION

In one aspect the present invention provides a method of processing a band-limited, over-sampled signal comprising: reducing the amplitude of those portions of the signal having peaks above a threshold value; and controlling the frequency position of the noise associated with the reduction of such peaks. Thereby the crest factor of the signal is reduced. The amplitude of those portions of the signal having peaks above a threshold value are not limited to the threshold value. Whilst they may be reduced to a value at or below the threshold value, they may be reduced to a level which is above the threshold value.

The step of reducing the amplitude may comprise: clipping the signal relative to the threshold; filtering the clipped signal; and combining the filtered clipped signal with the band-limited, over-sampled signal. The step of clipping the signal may comprise: limiting the amplitude of the signal to the threshold; and subtracting the limited signal from the band-limited, over-sampled signal.

The step of filtering the clipped signal may comprise creating a pulse having a pre-determined shape dependent upon the clipped samples.

The step of combining may comprise subtracting the filtered signal from the band-limited, over-sampled signal.

The step of combining may comprise delaying the band-limited, over-sampled signal by an amount corresponding to the time taken to implement the clipping and filtering steps.

The step of moving the noise may comprise filtering.

The step of controlling the frequency position of the noise, may comprise moving the noise outside the frequency band used by the signal.

The step of controlling the frequency position of the noise may comprise moving the noise outside the frequency band used by a signal transmitted in the opposite direction. The signal may contribute an echo to the signal transmitted in the opposite direction. Although this may result in the clipping noise being present in the used band of the transmitted signal, there may be circumstances where it is more desirable to ensure that no clipping noise contributes to the echo.

In another aspect the present invention provides a method of processing a band-limited, over-sampled signal comprising: clipping the signal at a given threshold; subtracting the clipped signal from the signal; filtering the subtracted signal to thereby control the frequency position of the clipping noise; delaying the signal; and subtracting the filtered signal from the delayed signal, thereby reducing the amplitude of those portions of the signal housing peaks above the threshold.

In a further aspect the invention provides a circuit for processing a band-limited, over-sampled signal, comprising: circuitry for reducing the amplitude of those portions of the signal having peaks above a threshold value; and circuitry for controlling the frequency position of the noise associated with such peaks.

The circuitry for reducing may comprise: a limiter for clipping the signal relative to the threshold; a filter for filtering the clipped signal; and an arithmetic unit for combining the filtered clipped signal with the signal. The arithmetic unit is preferably a subtractor.

The circuit may further include a delay circuit for providing a delayed version of the signal to the arithmetic unit.

The circuitry for controlling the frequency position of the noise preferably comprises a filter. The filter preferably controls the frequency position of the noise to move the noise outside the useful frequency band of the signal.

The circuitry for controlling the frequency position of the noise may control the noise to be positioned outside the frequency band used by the signal. The circuitry for controlling the frequency position of the noise may control the noise to be positioned outside the frequency band used by a signal transmitted in the opposite direction. The signal may contribute an echo to the signal transmitted in the opposite direction.

In a still further aspect the present invention provides a circuit for processing a band-limited, over-sampled signal comprising: a limiter for clipping the signal to a given threshold; a first subtractor for subtracting the clipped signal from the multi-carrier signal, thereby generating clipped samples; a filter for filtering the clipped samples to thereby control the frequency position of the clipping noise; a delay circuit for generating a delayed version of the multi-carrier signal; and a second subtractor for subtracting the filtered clipped samples from the delayed multi-carrier signal, wherein the amplitude of those portions of the signal having peaks above the threshold is reduced.

BRIEF DESCRIPTION OF THE DRAWINGS

The invention will now be described with regard to a non-limiting example with reference to the accompanying drawings in which.

DESCRIPTION OF THE PREFERRED EMBODIMENT

The invention is described herein with reference to a particular example concerning the processing of a signal generated by an ADSL (asymmetric digital subscriber line) modem. Such a modem generates a DMT (discrete multi-tone) signal carrying multiple carrier frequencies. Such signals are band-limited, over-sample signals. However, the invention is not limited to the processing of such a signal, and may be more broadly applied to the processing of any band-limited, over-sampled signal. The invention is not limited in its applicability to multi-carrier signals, but may also apply to single carrier signals. The following description uses the example of a multi-carrier signal for illustrative purposes only.

As discussed in the introduction hereinabove, as a result of the combining of multiple carriers, the signal at the output of the modem contains random peaks which are above a desired threshold. The level of the desired threshold is user or implementation dependent.

Figure 1:
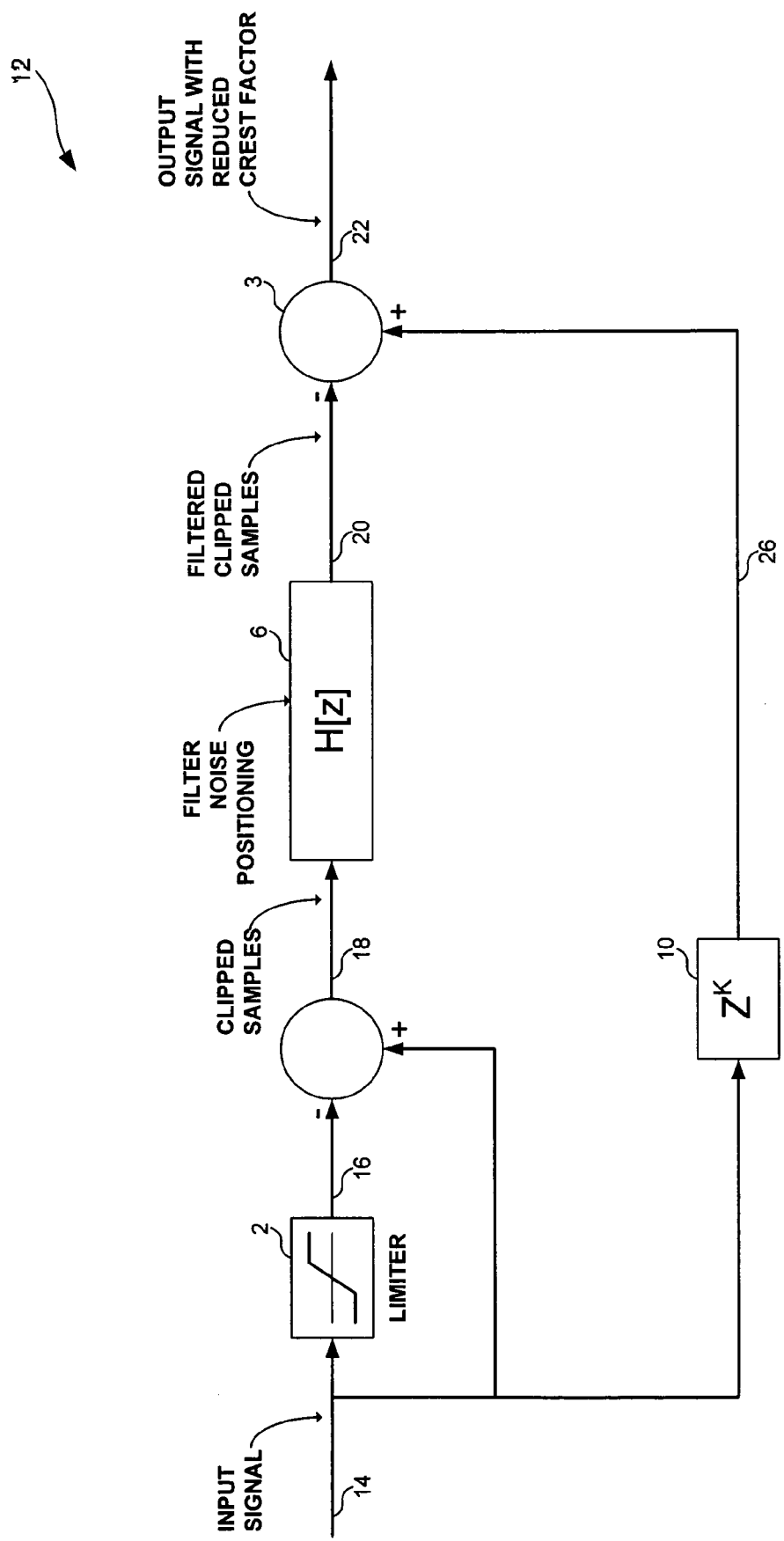
FIG. 1 illustrates a block diagram of a circuit for implementing the technique of the present invention.

Referring to FIG. 1, there is illustrated a block diagram of a digital circuit suitable for processing the multi-carrier signal at the output of the modem in accordance with a preferred embodiment of the present invention. The thus processed signal is then suitable for inputting to a line driver.

The digital circuit, generally designated by reference numeral 12, comprises a clipper or limiter 2, a filter 6, a delay unit 10, and two arithmetic or subtractor units 4 and 8.

Figure 2:
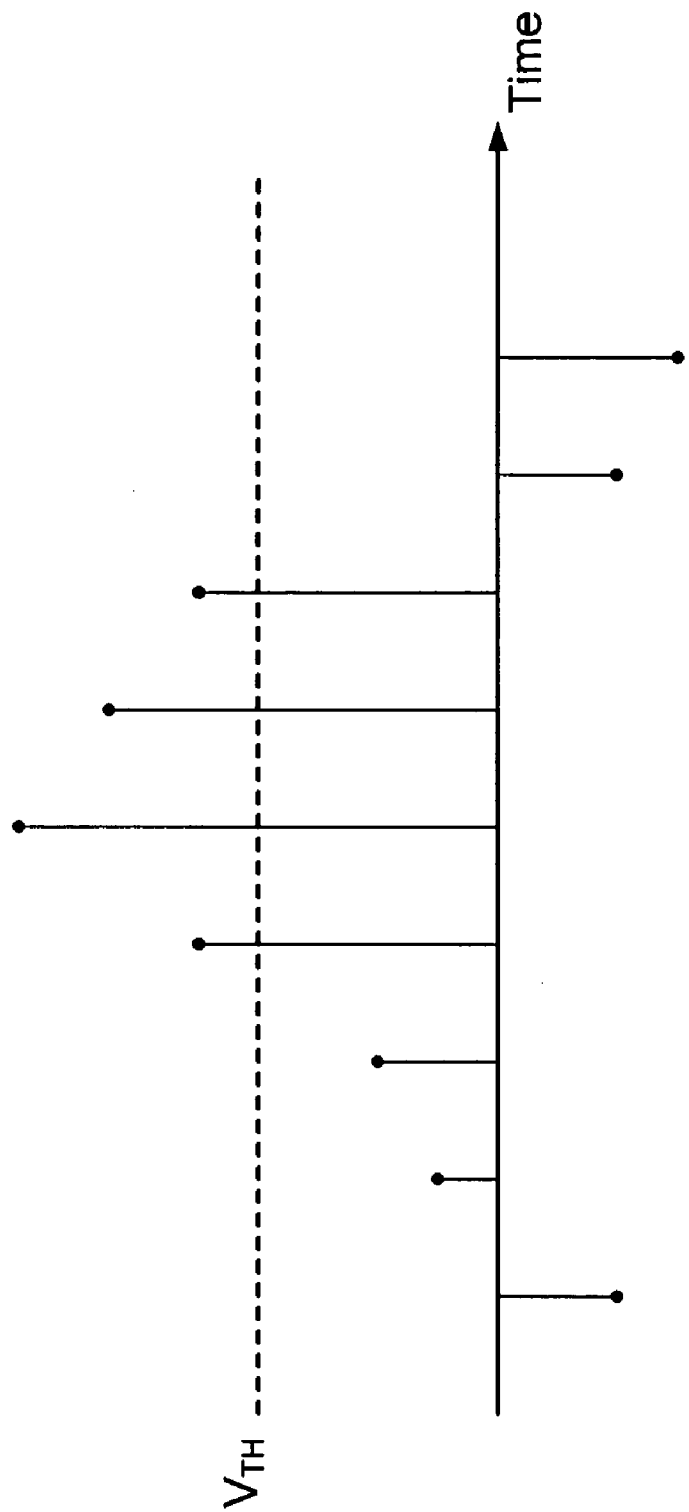
FIGS. 2 to 6 illustrate waveforms at various points in the circuit of FIG. 1 in an illustrative example.

The input to the digital circuit 12 on line 14 is, in this illustrative embodiment, the multi-carrier DMT signal comprising samples from the ADSL modem. The samples from the ADSL modem are over-sampled in order to obtain a band-limited signal. The samples from the ADSL modem on line 14 form an input to the limiter 2. Referring to FIG. 2, there is illustrated an example of the samples on line 14 forming an input to the digital circuit.

The limiter 2 clips the samples from the ADSL modem on line 14 at a given threshold and provides clipped samples on line 16. The threshold applied in the limiter 2 is determined based on the tolerable degradation of the bit error ratio, and will be user or implementation dependent. In general the lower the required bit error ratio, the higher the required threshold. The principles and implementation of such clipping are well-known in the art.

Figure 3:
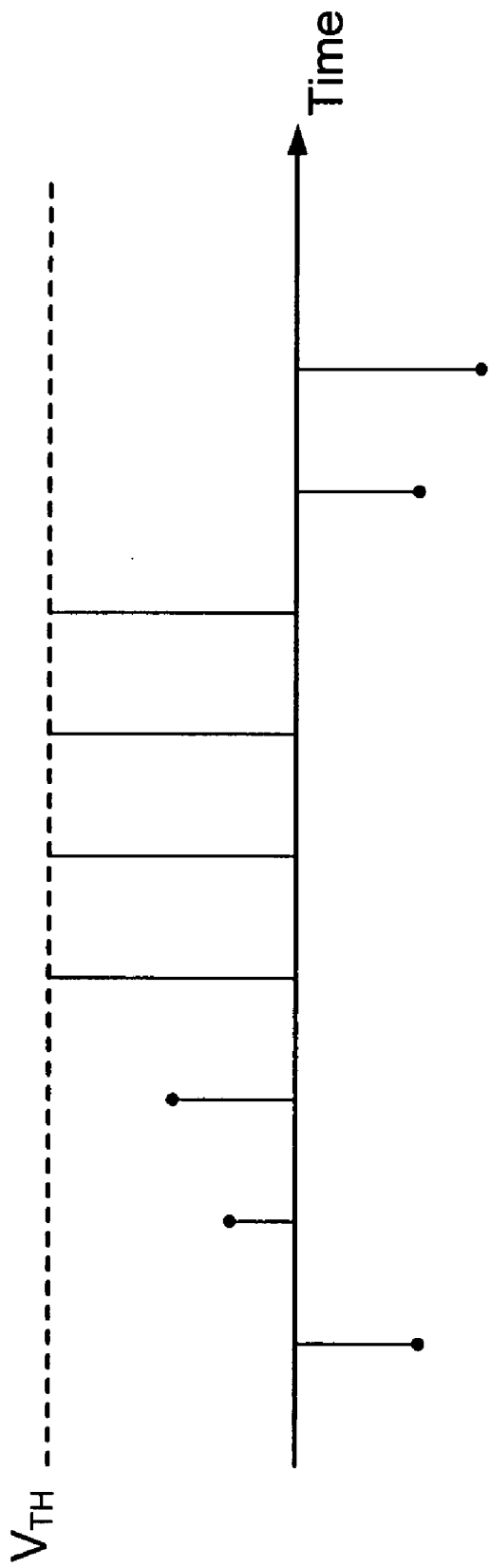

In the present example, it is assumed that the threshold value is a level $V_{TH}$. The limiter or clipper 2 thus generates a sequence of pulses including four pulses corresponding to the four pulses above the threshold value $V_{TH}$ as shown in FIG. 3. As can be seen in FIG. 3, the amplitude of these four pulses is limited at the output of the limiter or clipper 2 to the threshold value $V_{TH}$.

The clipped samples on line 16 are provided to the arithmetic unit 4 together with the samples from the ADSL modem on line 14. The arithmetic unit 4 subtracts the clipped samples on line 16 from the samples from the ADSL modem on line 14, and a sequence of clipped samples is thus generated on line 18, as shown in FIG. 4.

Figure 4:
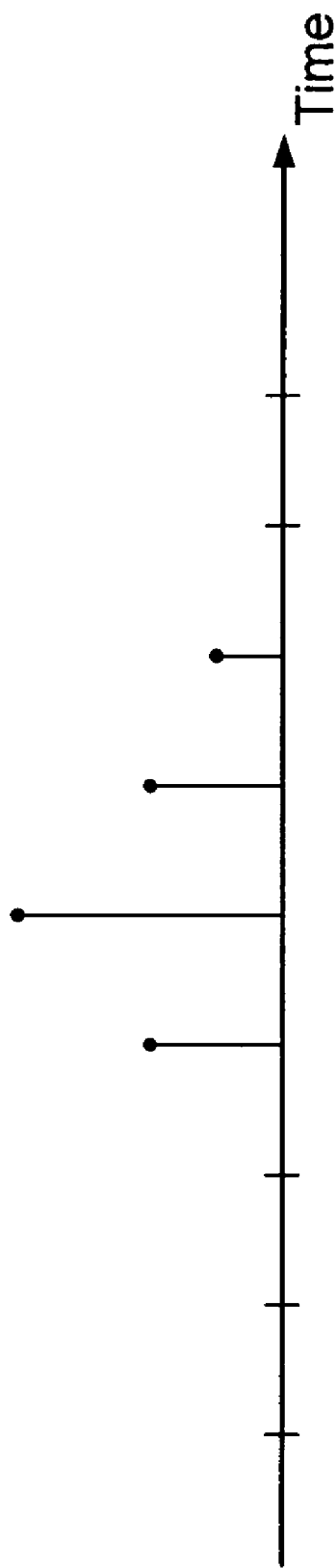

Referring to FIG. 4, it can be seen that the clipped samples indicate four samples corresponding to the four original samples above the threshold value $V_{TH}$. The amplitude of these samples corresponds to their amplitude above the threshold value $V_{TH}$.

Thus the subtraction performed by the subtractor 4 extracts the part of the samples of the incoming signals which are above the threshold.

The sequence of clipped samples on line 18 are then provided as an input to the filter 6. The filter 6 filters the clipped samples on line 18 to shape the noise generated by the clipping operation. The filter computes a pulse from the clipped samples which has a spectrum outside the signal bandwidth of the useful signal. Thus, in this preferred embodiment, the filter outputs a sequence of samples which have a spectrum outside the used band of the multi-carrier ADSL signal generated by the modem.

This type of processing, where the samples are moved out of band, is known as soft-clipping. By contrast, hard-clipping would result in the samples (and thus the noise) remaining in band. Soft-clipping techniques using a filter are well-known to one skilled in the art. Similarly the use of filters generally to control the frequency position of a signal is well-known.

In this preferred embodiment the filtering is carried out using a Finite Impulse Response Filter.

Although in this preferred embodiment the filter is utilised to ensure the noise is out of bound, in general it would be possible to derive from the clipped samples a pulse with a "good" spectrum. However, without shifting the noise outside the used frequency band good performance is not achieved in the illustrative embodiment described herein.

In general terms, the filter controls the frequency position of the noise associated with the peaks above the threshold value. In certain applications, it may be advantageous to control the frequency position within the useful band of the band-limited, over-sampled signal.

In one example of such a scenario, the noise associated with the clipping of the peaks above the threshold is controlled so as to be outside the useful band of the signal received in the modem. As is well-known in the art, the signal received in the modem is susceptible to echo effects due to the signal transmitted in the same modem, the echo effect being a characteristic of a hybrid used to transmit and received signals on the communication channel. By ensuring that the clipping noise is moved outside the useful band of any signal received in the hybrid of the modem, then any clipping noise leakage in the echo is reduced. Although this may result in the clipping noise being present in the used band of the transmitted signal, there may be circumstances where it is more desirable to ensure that no clipping noise contributes to the echo.

In the present illustrative embodiment, and in most applications, it is preferable to move this noise outside the useful band.

Figure 5:
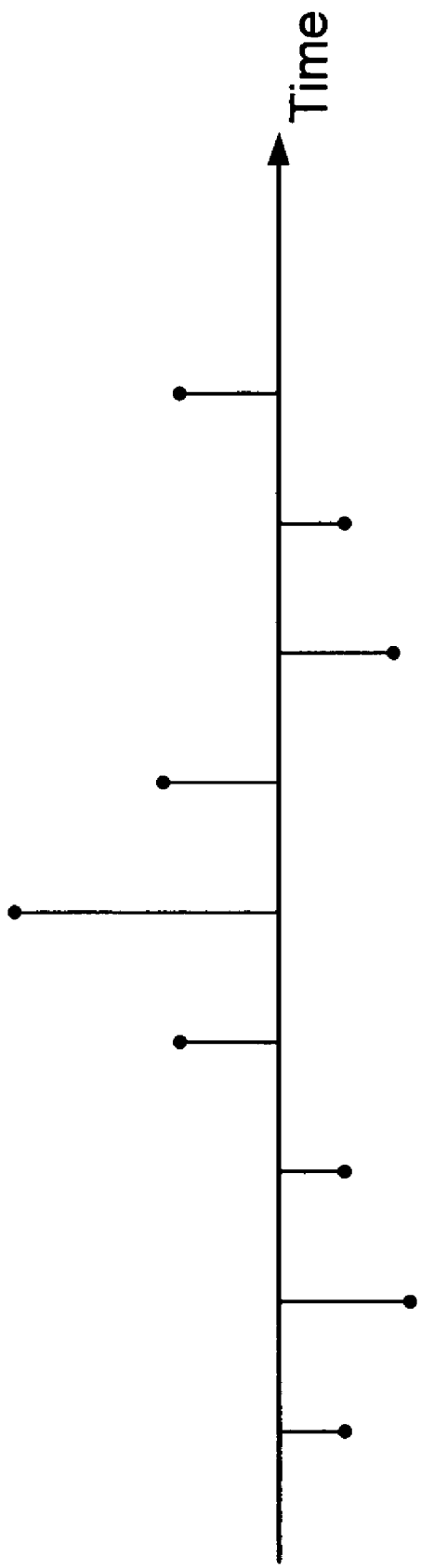

Thus, in the illustrative embodiment the filter provides a modified version of the clipped samples in the incoming signal in another frequency spectrum. The shape of the filtered clipped samples is shown in FIG. 5.

The sequence of filtered clipped samples generated by the filter 6 are provided on line 20 to the arithmetic unit 8. The arithmetic unit 8 also receives on line 24 a delayed version of the input signal on line 14. The delayed signal is provided by the delay unit 10. The delay is provided to compensate for the computation time in the limiter 2 and the filter 6, such that the timing of the delayed version (or replica) of the input signal coincides with the pulses at the output of the filter. The filtered clipped samples on line 20 are subtracted from the delayed version of the input signal on line 24 in the subtractor 8. This subtraction removes the pulse, generated from the clipped samples, from the incoming signal.

Figure 6:
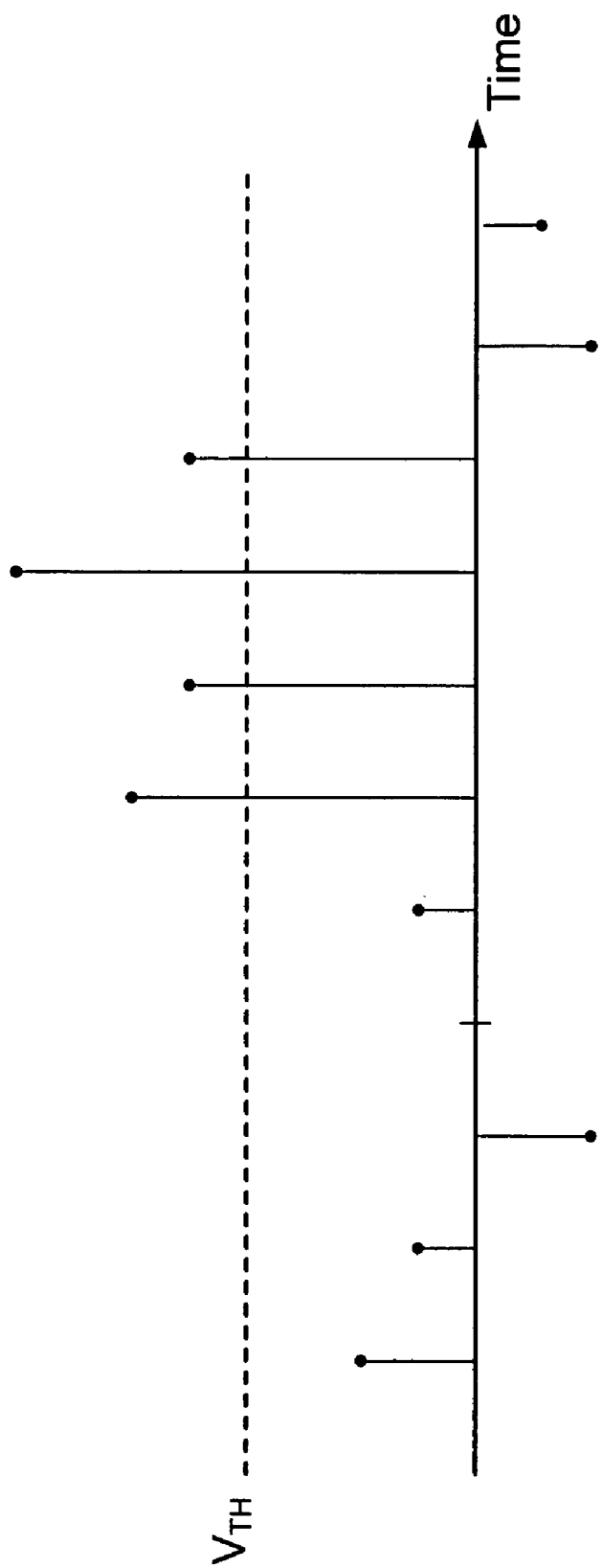

The waveform resulting from this subtraction is illustrated in FIG. 6. As can be seen from FIG. 6, although the signal still has peaks above the threshold value $V_{TH}$, the peaks of the signal which originally exceeded $V_{TH}$ are reduced with respect to the original signal. The peak voltage and the power consumption of the signal provided to the line driver on line 22 are thus decreased. Although FIG. 6 illustrates that none of the peaks are actually reduced below $V_{TH}$, those peaks which are initially only a certain level above $V_{TH}$ may be reduced to a level at or below $V_{TH}$.

The crest factor of the final signal output by the digital circuit 12 on line 22 depends on three factors:

1. The maximal crest factor of the input signal on line 14;
2. The threshold value used in the limiter 2; and
3. The way in which the pulse is derived from the clipped samples in the filter 6.

There is an obvious relationship between the first two factors and the final crest factor: the higher the maximal input, the higher the maximal output; and the higher the threshold value, the higher the maximal output.

As regards the filter, optimisation of the design to adjust the final maximal crest factor will be dependent upon the design of the filter itself. The design of the filter is outside the scope of the present invention, but will be readily realised by one skilled in the art.

Thus the present invention provides a technique in which any peaks above a threshold level are reduced, but not clipped, such that the effects of such peaks is reduced. Although the implementation of the technique preferably includes a clipping step, it is performed on the front-end rather than as the last step in the technique, such that the output signal is not a clipped signal. Any noise introduced by the clipping step, so-called clipping noise, is preferably filtered out of the useful frequency band of the signal.

Although the invention is described herein with respect to processing samples in the digital domain, the principles of the invention apply also to the analogue domain.

What is claimed is:

1. A method of processing a band-limited, over-sampled signal having a sequence of peaks, comprising:
    reducing the amplitude of those portions of the band-limited over-sampled signal having peaks above a threshold value by:
        clipping the band-limited over-sampled signal relative to said threshold value,
        subtracting the clipped signal from the band-limited over-sampled signal;
        filtering the subtracted signal,
        subtracting the filtered signal from the band-limited, over-sampled signal to produce an output signal; and
    controlling a frequency position of a noise associated with the reduction of such peaks.

2. The method of claim 1 wherein the step of controlling the frequency position of the noise is combined at least in part with the step of filtering the clipped band-limited over-sampled signal.

3. The method of claim 2 wherein the step of filtering the clipped band-limited over-sampled signal comprises creating a pulse having a pre-determined shape dependent upon the band-limited over-sampled signal.

4. The method of claim 1 wherein the step of subtracting comprises delaying the band-limited, over-sampled signal by an amount corresponding to the time taken to implement the clipping and filtering steps.

5. The method of claim 1 wherein the step of controlling the frequency position of the noise comprises moving the noise outside the frequency band used by the band-limited over-sampled signal.

6. The method of claim 1 wherein the step of controlling the frequency position of the noise comprises moving the noise outside the frequency band used by a signal transmitted in a direction opposite to a transmission direction of said band-limited over-sampled signal.

7. The method of claim 6 wherein the signal contributes an echo to the signal transmitted in said opposite direction.

8. A method of processing a band-limited over-sampled signal comprising:
    clipping the band-limited over-sampled signal at a given threshold;
    subtracting the clipped signal from the band-limited over-sampled signal;
    filtering the subtracted signal to thereby control a frequency position of a clipping noise of said clipped signal and produce a filtered clipped signal;
    delaying the band-limited over-sampled signal; and
    subtracting the filtered clipped signal from the delayed band-limited over-sampled signal, thereby reducing the amplitude of those portions of the band-limited over-sampled signal having peaks above the given threshold.

9. A circuit for processing a band-limited over-sampled signal having a sequence of peaks, comprising:
    circuitry for reducing the amplitude of those portions of the band-limited over-sampled signal having peaks above a threshold value by clipping the band-limited over-sampled signal relative to said threshold value, subtracting the clipped signal from the band-limited over-sampled signal, filtering the subtracted signal, and subtracting the filtered signal from the band-limited, over-sampled signal to produce an output signal; and
    circuitry for controlling a frequency position of the noise associated with the reduction of such peaks.

10. The circuit of claim 9 wherein the circuitry for reducing comprises:
    a limiter for clipping the band-limited over-sampled signal relative to said threshold;
    a filter for filtering the clipped band-limited over-sampled signal; and
    an arithmetic unit for combining the filtered clipped band-limited over-sampled signal with the signal.

11. The circuit of claim 10 wherein the arithmetic unit is a subtractor.

12. The circuit of claim 10 further including a delay circuit for providing a delayed version of the band-limited over-sampled signal to the arithmetic unit.

13. The circuit of claim 9 wherein the circuitry for controlling the frequency position of the noise comprises a filter.

14. The circuit of claim 9 wherein the circuitry for controlling the frequency position of the noise controls the noise to be positioned outside the frequency band used by the band-limited over-sampled signal.

15. The circuit of claim 9 wherein the circuitry for controlling the frequency position of the noise controls the noise to be positioned outside the frequency band used by a signal transmitted in a direction opposite to a transmission direction of said band-limited over-sampled signal.

16. The circuit of claim 15 wherein the signal contributes an echo to the signal transmitted in said opposite direction.

17. A circuit for processing a multi-carrier signal comprising:
    a limiter for clipping the multi-carrier signal to a given threshold;
    a first subtractor for subtracting the clipped signal from the multi-carrier signal, thereby generating clipped samples;
    a filter for filtering the clipped samples to thereby control a frequency position of a clipping noise of said clipped samples;
    a delay circuit for generating a delayed version of the multi-carrier signal; and
    a second subtractor for subtracting the filtered clipped samples from the delayed multi-carrier signal, wherein the amplitude of those portions of the multi-carrier signal having peaks above the given threshold is reduced.

* * * * *